(12) United States Patent
Chou et al.

(10) Patent No.: US 9,792,685 B2
(45) Date of Patent: *Oct. 17, 2017

(54) IMAGE CAPTURING DEVICE AND METHOD FOR CALIBRATING IMAGE DEFORMATION THEREOF

(71) Applicant: Altek Semiconductor Corp., Hsinchu (TW)

(72) Inventors: Hong-Long Chou, Hsinchu County (TW); Ming-Jiun Liaw, Miaoli County (TW); Yi-Yi Yu, Kaohsiung (TW); I-Te Yu, Tainan (TW); Yu-Chih Wang, Tainan (TW); Che-Lun Chuang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 372 days.

This patent is subject to a terminal disclaimer.

(21) Appl. No.: 14/315,272

(22) Filed: Jun. 25, 2014

(65) Prior Publication Data
US 2015/0213589 A1   Jul. 30, 2015

(30) Foreign Application Priority Data

Jan. 28, 2014  (TW) .............................. 103103260 A

(51) Int. Cl.
*G06F 17/18* (2006.01)
*G06T 7/00* (2017.01)
(Continued)

(52) U.S. Cl.
CPC ............... *G06T 7/002* (2013.01); *G06T 7/85* (2017.01); *H04N 13/0239* (2013.01); *H04N 13/0246* (2013.01); *G06T 2207/10012* (2013.01)

(58) Field of Classification Search
CPC ...... H04N 13/02; H04N 13/246; H04N 13/04; G03B 3/00; G03B 13/00
See application file for complete search history.

(56) References Cited

U.S. PATENT DOCUMENTS

| 8,027,582 B2* | 9/2011 | Li ........................ G06T 7/0069 348/349 |
| 2011/0007135 A1* | 1/2011 | Okada .................. G11B 27/322 348/46 |
| 2012/0249750 A1* | 10/2012 | Izzat .................... G06T 7/0022 348/47 |

FOREIGN PATENT DOCUMENTS

| CN | 102313515 | 10/2013 |
| EP | 2309451 | 1/2013 |

(Continued)

OTHER PUBLICATIONS

Fusiello et al., "A compact algorithm for rectification of stereo pairs", Machine Vision and Applications, Mar. 2, 2000, pp. 16-22.

(Continued)

*Primary Examiner* — Sath V Perungavoor
*Assistant Examiner* — Patricia I Young
(74) *Attorney, Agent, or Firm* — Jianq Chyun IP Office

(57) ABSTRACT

An image capturing device and a method for calibrating image deformation thereof are provided. The image capturing device has a first image sensor and a second image sensor and the method includes following steps. A plurality of image groups are captured through the first image sensor and the second image sensor. Each of the image groups includes a first image and a second image, and the image groups include a reference image group. Whether an image deformation occurs on a first reference image and a second reference image in the reference image group is detected. If it is detected that the image deformation occurs on the reference image group, a current calibration parameter is (Continued)

updated according to a plurality of feature point comparison values corresponding to the image groups. The current calibration parameter is used for performing an image rectification on each of the first images and the second images.

10 Claims, 7 Drawing Sheets

(51) Int. Cl.
*H04N 13/02* (2006.01)
*G06T 7/80* (2017.01)

(56) References Cited

FOREIGN PATENT DOCUMENTS

| TW | 201201114 | 1/2012 |
|----|-----------|--------|
| TW | 201310004 | 3/2013 |

OTHER PUBLICATIONS

"Office Action of Taiwan Counterpart Application", issued on May 28, 2015, p. 1-p. 6, in which the listed references were cited.

\* cited by examiner

IMAGE CAPTURING DEVICE AND METHOD FOR CALIBRATING IMAGE DEFORMATION THEREOF

CROSS-REFERENCE TO RELATED APPLICATION

This application claims the priority benefit of Taiwan application serial no. 103103260, filed on Jan. 28, 2014. The entirety of the above-mentioned patent application is hereby incorporated by reference herein and made a part of this specification.

BACKGROUND OF THE INVENTION

Field of the Invention

The invention relates to an image capturing device, and more particularly, to a method for calibrating image deformation and an image capturing device using the method.

Description of Related Art

For the current depth image sensing technique, it is commonly seen that image capturing devices with binocular lenses are employed to capture images corresponded to various view angles, so that three-dimensional (3D) depth information of a target object may be calculated by the images corresponded to various view angles. Therefore, in order to precisely obtain the 3D depth information of the target object from the 2D images, the spatial configuration between the two lenses has to be specifically designed and the delicate parameter calibration is a necessary procedure. To be more specific, when the manufactures fabricate the image capturing devices with binocular lenses, each corresponding spatial position of the binocular lenses is incapable of being accurately disposed on the precise pre-determined settings. As such, during the process of fabricating the image capturing devices, the manufacturers calibrate the disposed binocular lenses modules in advance, and thus a set of factory-default calibrating parameters is obtained. In the future, the image capturing device may employ these factory-default calibrating parameters to calibrate the images captured by the binocular lenses during the process of users operating the image capturing device, so as to overcome the lack of precision in the processes.

However, during the process of users operating or carrying the image capturing device, it is possible to cause the spatial position variation of lenses (such as, displacement or rotation) as the image capturing device being extruded, impacted or dropped. Once the circumstance of the lens being displaced or deformed occurs, these factory-default calibrating parameters are no longer complied with the current application circumstance, such that the image capturing device is incapable of obtaining the correct depth information. For example, if the horizontal disequilibrium has occurred between the binocular lenses of the stereoscopic image capturing device, due to the horizontals of the captured left- and right-frames are mismatched after the disequilibrium, the 3D photographing effects are lead to be poor.

SUMMARY OF THE INVENTION

Accordingly, the invention is directed to an image capturing device and a method for calibrating image deformation thereof, and capable of adaptively adjusting a calibration parameter for an image rectification in response to an offset status of binocular lenses sensor.

The invention proposes a method for calibrating image deformation adapted to an image capturing device having a first image sensor and a second image sensor. The image capturing device has current calibration parameter associated with the first image sensor and the second image sensor, and the method for calibrating image deformation includes the following steps. A plurality of image groups are captured through the first image sensor and the second image sensor, wherein each of the image groups includes a first image and a second image, and the image groups include a reference image group. It is detected whether an image deformation occurs on a first reference image and a second reference image in the reference image group. If it is detected that the image deformation occurs on the reference image group, a current calibration parameter is updated according to a plurality of feature point comparison values corresponding to the image groups. The current calibration parameter is used for performing an image rectification on each of the first images and the second images.

In an embodiment of the invention, the step of detecting whether the image deformation occurs on the reference image group includes the following steps. A first feature point of the first reference image and a second feature point of the second reference image are detected. Whether an offset between image coordinates of the first feature point of the first reference image and the second feature point of the second reference image exceeds a threshold is determined. If the determination is yes, it is determined that the image deformation occurs on the reference image group.

In an embodiment of the invention, the step of detecting whether the image deformation occurs on the reference image group includes the following steps. A three dimensional depth estimation is performed according to the first reference image and the second reference image to generate reference depth information of a reference focus target in the reference image group, and a depth focus position related to the reference focus target is obtained according to the reference depth information. An autofocus position related to the reference focus target by an autofocus procedure is obtained. Whether the depth focus position corresponding to the reference focus target matches the autofocus position is determined. If the determination is no, it is determined that the image deformation occurs on the reference image group.

In an embodiment of the invention, before the step of updating the current calibration parameter according to the feature point comparison values corresponding to the image groups, the method for calibrating image deformation further includes the following steps. A three dimensional depth estimation is performed on the image groups to generate depth information of each of the image groups. Whether to keep the image group is determined according to the depth information of each of the image groups.

In an embodiment of the invention, the step of updating the current calibration parameter according to the feature point comparison values corresponding to the image groups further includes the following steps. A feature point detection is performed on the first images and the second images to obtain a plurality of first feature points of the first images and a plurality of second feature points of the second images. Coordinate positions of the first feature points and coordinate positions of second feature points respectively corresponding to the first feature points are compared with each other to obtain the feature point comparison values of the first feature points and the second feature points. The feature point comparison values of the first feature points and the second feature points are recorded.

In an embodiment of the invention, the step of recording the feature point comparison values of the first feature points and the second feature points further includes the following steps. Each of the feature point comparison values are classified into a plurality of statistics bins according to the coordinate positions of the first feature points and/or the coordinate positions of the second feature points.

In an embodiment of the invention, the step of updating the current calibration parameter according to the feature point comparison values corresponding to the image groups further includes the following steps. Whether the feature point comparison values are sufficient for computation is determined according to an amount of the feature point comparison values in each of the statistics bins and a plurality of depth values corresponding to the feature point comparison values. If the determination is yes, the current calibration parameter is updated according to the feature point comparison values. Therein, the depth values are obtained by performing the three dimensional depth estimation on the first feature points and the corresponding second feature points.

From another prospective, the invention proposes an image capturing device, and the image capturing device has a first image sensor and a second image sensor. The image capturing device further includes a storage unit and a processing unit. The storage unit records a plurality of modules, and stores a current calibration parameter associated with the first image sensor and the second image sensor. The processing unit is coupled to the first image sensor, the second image sensor and the storage unit to access and execute the modules recorded in the storage unit. The modules include a capturing module, a deformation detection module and a parameter updating module. The capturing module captures a plurality of image groups through the first image sensor and the second image sensor. Each of the image groups includes a first image of the first image sensor and a second image of the second image sensor, and the image groups include a reference image group. The deformation detection module detects whether an image deformation occurs on the first reference image and the second reference image in the reference image group. If it is detected that the image deformation occurs on the reference image group, the parameter updating module updates a current calibration parameter according to a plurality of feature point comparison values corresponding to the image groups. The current calibration parameter is used for performing an image rectification on each of the first images and the second images.

Based on above, in the embodiments of the method for calibrating image deformation of the invention, when the current calibration parameter can no longer perform the accurate image rectification, a database may be established by utilizing the feature point information on the image groups captured in different scene and different time points for updating the current calibration parameter according to the integral information in the database. Accordingly, even if the offset occurs on the left and right lenses, the image capturing device may still dynamically and adaptively generate the new calibration parameter to avoid inaccurate image rectification performed by using the calibration parameter mismatching the current condition. As a result, actions of updating the parameters may be automatically performed without being noticed by the user to ensure a capturing quality of the image capturing device and improve user experience.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

When the image capturing device is roll out, the spatial deposition between the dual lenses thereof has been precisely calculated and adjusted to generate a set of factory default calibration parameters. The factory default calibration parameters are used for calibrating images captured by the different lenses into a designed and fixed coordinate parameter relation. In order to solve the problem in which the factory default calibration parameters are no longer suitable due to offset or rotation occurred on the dual lenses, the invention establishes a database recorded with a plurality of feature point information according to depth information and pixel position of the images, and adaptively updates the calibration parameters by utilizing the information accumulated in the database. In order to make the content of the invention more comprehensible, embodiments are described below as the examples to prove that the invention can actually be realized.

Figure 1:
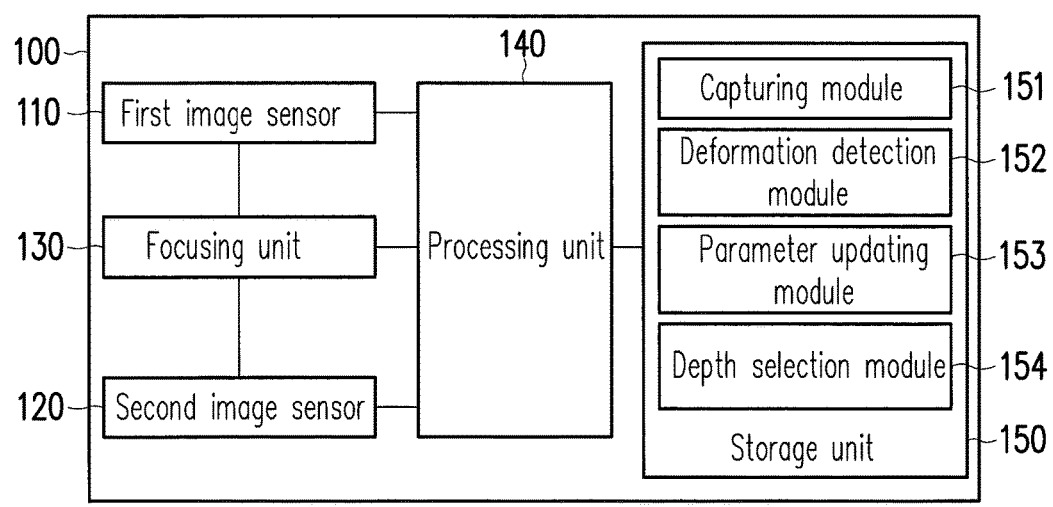
FIG. 1 is a block diagram illustrating an image capturing device according to an embodiment of the invention.

FIG. 1 is a block diagram illustrating an image capturing device according to an embodiment of the invention. Referring to FIG. 1, an image capturing device 100 of the present embodiment is, for example, digital cameras, digital camcorders or other hand-held electronic devices having image capturing capabilities such as smart phones and tablet PCs, but the invention is not limited to the above. The image capturing device 100 includes a first image sensor 110, a second image sensor 120, a focusing unit 130, a processing unit 140 and a storage unit 150.

The first image sensor 110 and the second image sensor 120 each includes a lens and an optical sensing element. The optical sensing element is, for example, a charge coupled device (CCD), a complementary metal-oxide semiconductor (CMOS) device or other devices. The first image sensor 110 and the second image sensor 120 may further include apertures and so on, which are not limited in the invention. In addition, based on disposing positions of the lenses of the first image sensor 110 and the second image sensor 120, the lenses of the first image sensor 110 and the second image sensor 120 may be further respectively served as a left lens and a right lens.

In the present embodiment, the focusing unit 130 is coupled to the first image sensor 110, the second image sensor 120 and the processing unit 140, and is configured to control focal lengths of the first image sensor 110 and the second image sensor 120. Namely, the focusing unit 130 controls the lenses of the first image sensor 110 and the second image sensor 120 to move to a focus position. The focusing unit 130 may control a step position of the lens through a voice coil motor (VCM) or motors of other types, so as to change the focal lengths of the first image sensor 110 and the second image sensor 120.

The processing unit 140 may be, for example, a central processing unit (CPU), a microprocessor, an application specific integrated circuits (ASIC), a programmable logic device (PLD) or other hardware devices with a computing capability. The storage unit 150 is, for example, a random access memory, a flash memory or other memories, and used to store a current calibration parameter and a plurality of modules; whereas the processing unit 140 is coupled to the storage unit 150 and used to execute the modules. The modules includes a capturing module 151, a deformation detection module 152, a parameter updating module 153 and a depth selection module 154, and said modules may be, for example, computer programs which can be loaded into the processing unit 140 to execute functions for calibrating image deformation.

Figure 2:
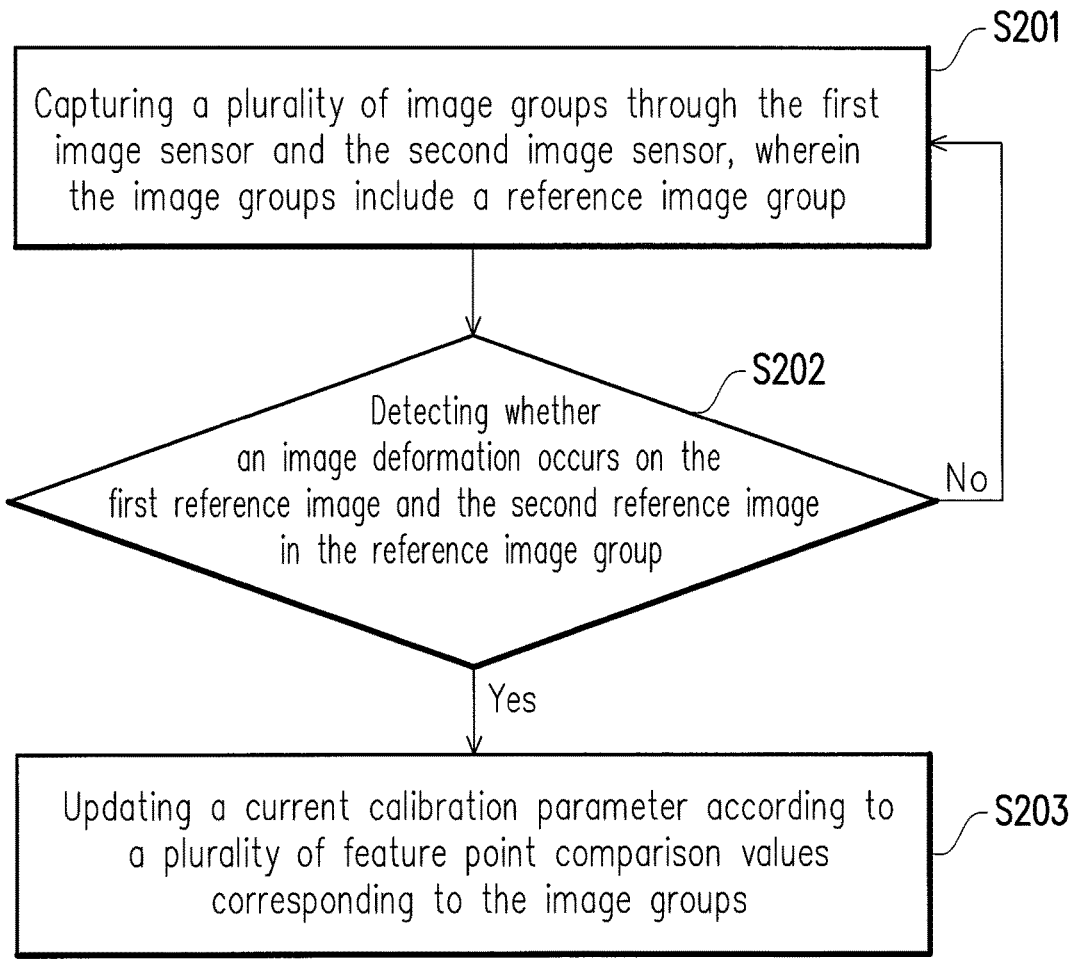
FIG. 2 is a flowchart illustrating a method for calibrating image deformation according to an embodiment of the invention.

FIG. 2 is a flowchart illustrating a method for calibrating image deformation according to an embodiment of the invention. A method of the present embodiment is adapted to the image capturing device 100 of FIG. 1. The following detailed steps are elaborated to describe the method for calibrating image deformation of the present embodiment with the reference to each element of the image capturing device 100.

First, in step S201, the capturing module 151 captures a plurality of image groups through the first image sensor 110 and the second image sensor 120. Each of the image groups includes a first image and a second image, and the image groups at least include a reference image group. In other words, in the present embodiment, one single image group includes two images, and the first image and the second image in the same image group are two images respectively captured by the left lens and the right lens from the same scene at the same time. Namely, the first image is, for example, a left image captured by the left lens, and the second image is, for example, a right image captured by the right lens, accordingly. In the present embodiment, the first image and the second image are, for example, live-view images captured in a preview mode.

Similarly, the reference image group is one of the image groups captured by the image capturing device 100, so that the reference image group also includes a first reference image corresponding to the first image sensor 110 and a second reference image corresponding to the second image sensor 120. In step S202, the deformation detection module 152 detects whether an image deformation occurs on the first reference image and the second reference image in the reference image group. It should be noted that, the deformation detection module 152 may perform a detection for the image deformation in a manner of timing detection on a part of the image groups as well as perform the detection for the image deformation on all of the image groups, and the reference image group herein represents one of targets used by the deformation detection module 152 to detect whether the image deformation occurs.

It should be noted that, the factory default calibration parameters are adapted for performing an image rectification respectively on the left and right images to make the two real images to include only a horizontal disparity or only a vertical disparity (which are caused by the positions of lenses placement). For example, there may be a slight difference in elevation angles between the dual lenses. By performing the image rectification through the factory default calibration parameters, the real images may be converted as though the left and right lenses are placed on the same image capturing plane and left only differences in horizontal or vertical positions. Namely, under a premise of disposing the left and right lenses horizontally, each pixel point on the left and right images rectified by the image rectification should only include the differences in the horizontal positions. In this case, if changes are made in a capturing direction of the left and right lenses, yet each pixel point on the left and right images rectified by the image rectification still includes the differences in the vertical positions, this phenomenon is then referred to as the image deformation. Herein, the deformation detection module 152 is capable of determining whether the image deformation occurs on the reference image group according to an offset between the feature points on the first reference image and the second reference image corresponding to each another or by performing a three dimensional depth estimation on the first reference image and the second reference image.

Figure 3A:
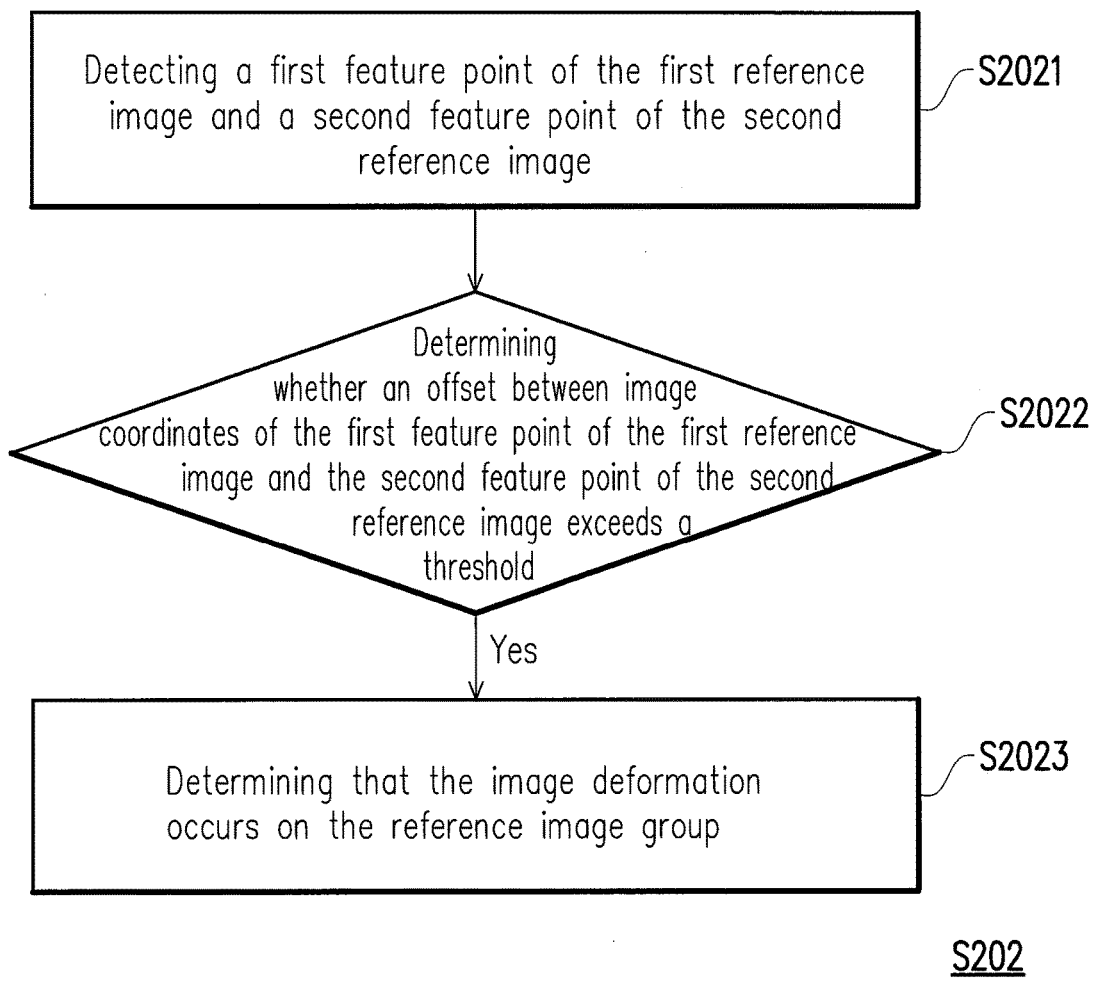
FIG. 3A and FIG. 3B are detailed flowcharts illustrating step S202 according to an embodiment of the invention.

More specifically, FIG. 3A is a detailed flowchart illustrating step S202 according to the embodiment of FIG. 2. In the embodiment depicted in FIG. 3A, in step S2021, the deformation detection module 152 detects a first feature point of the first reference image and a second feature point of the second reference image. Thereafter, in step S2022, the deformation detection module 152 determines whether an offset between image coordinates of the first feature point of the first reference image and the second feature point of the second reference image exceeds a threshold. If it is determined that the offset between the image coordinates of the first feature point of the first reference image and the second feature point of the second reference image exceeds the threshold, the deformation detection module 152 determines that the image deformation occurs on the reference image group in step S2023. Namely, whether the image deformation occurs on the first reference image and the second reference image may be informed by analyzing and counting displacement information of at least one first feature point and the second feature point corresponding to the first feature point.

In other words, the deformation detection module 152 is capable of detecting any feature point of the reference image group according to algorithms for detecting the feature point in conventional art. The algorithms for detecting the feature point is used to detect multiple feature points in the image, and may be an edge detection algorithm, a conner detection algorithm or other algorithms for detecting the feature point, which are particularly limited in the invention. Thereafter, the deformation detection module 152 determines whether the offset between the image coordinates of the first feature point and the second featured point exceeds said threshold, so as to detect whether the image deformation occurs on the reference image group. For instance, the deformation detection module 152 may determine whether a vertical offset (an offset difference in vertical direction) between the first feature point and the second feature point exceeds said threshold. When the deformation detection module 152 determines that the vertical offset exceeds said threshold, it indicates that the image deformation occurs on the reference image group.

Figure 3B:
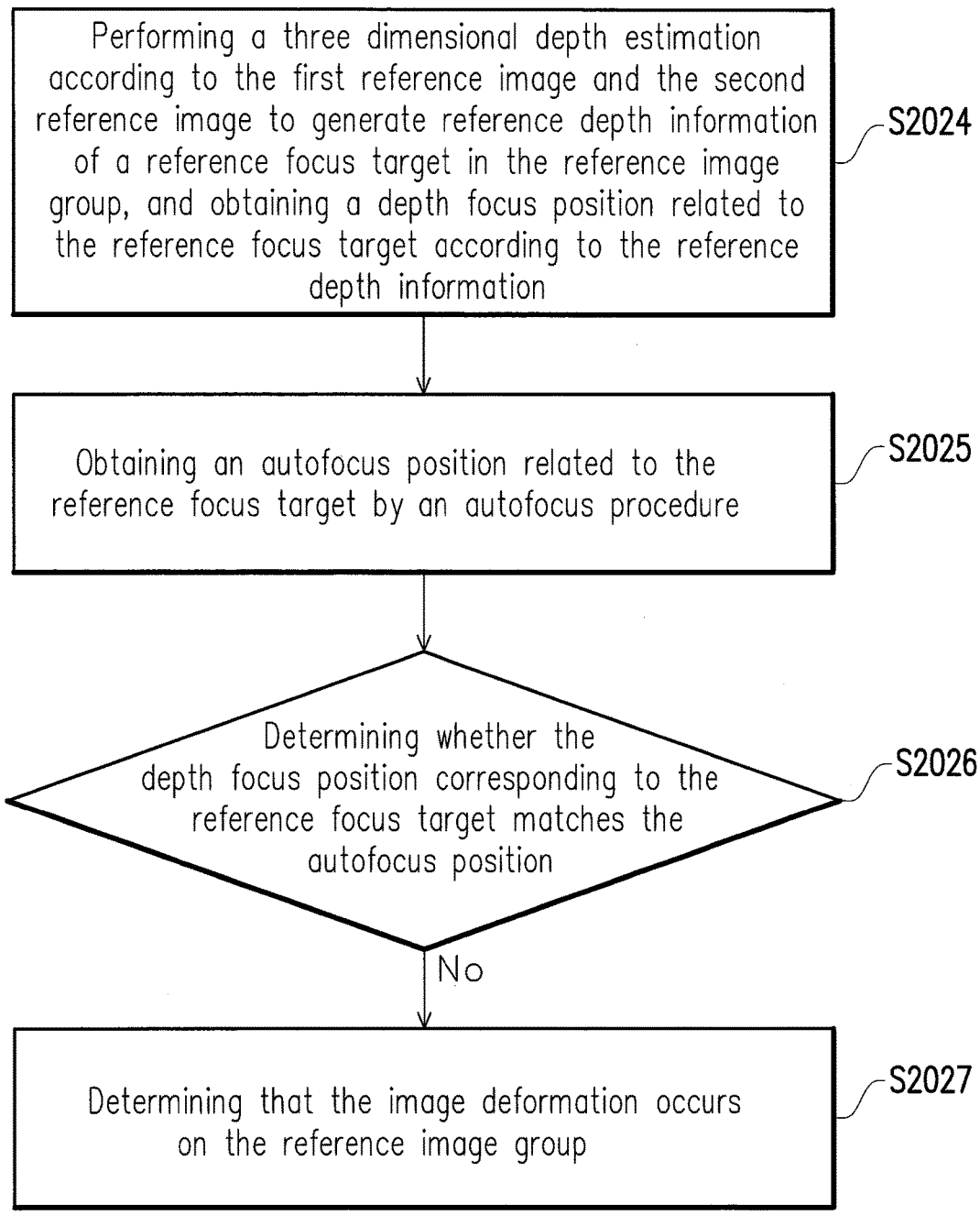

As another embodiment, FIG. 3B is a detailed flowchart illustrating step S202 according to the embodiment of FIG. 2. In the embodiment depicted in FIG. 3B, in step S2024, the deformation detection module 152 performs a three dimensional depth estimation according to the first reference image and the second reference image to generate reference depth information of a reference focus target in the reference image group, and obtains a depth focus position related to the reference focus target according to the reference depth information. Next, in step S2025, the deformation detection module 152 obtains an autofocus position related to the reference focus target by an autofocus procedure. In step S2026, the deformation detection module 152 determines whether the depth focus position corresponding to the reference focus target matches the autofocus position. If the determination is no, the deformation detection module 152 determines that the image deformation occurs on the reference image group.

Specifically, the deformation detection module 152 may obtain a three-dimensional coordinate position of the target in space and the depth information of each pixel in the image by performing an image processing technology for stereo vision. Furthermore, the step of obtaining the depth focus position related to the target according to the depth information includes, for example, obtaining the focus position related to the target by querying a depth lookup table according to the depth information. Accordingly, by obtaining a corresponding relation between a definition of the target in the image and a step of the step motor (or a current value of the voice coil motor) in advance, the step of the step motor (or the current value of the voice coil motor) corresponding to this depth information may be found according to the obtained depth information of the target so as to obtain the depth focus position related to the target.

On the other hand, the process of executing the autofocus process may include, for example, automatically controlling the lens module to perform a wild range of movement through the focusing unit 130 to respectively adjust the focus positions required by the lenses of the first image sensor 110 and the second image sensor 120, so as to obtain the autofocus position related to the target. The focusing unit 130 obtains the autofocus position related to the target by utilizing, for example, a hill-climbing method used in the autofocus technology, but the invention is not limited thereto. Accordingly, in case the image deformation does not occur on the first reference image and the second reference image, an ideal depth information may be obtained by the image capturing device 100, such that the depth focus position may be consistent with the autofocus position. If the image capturing device 100 cannot obtain the ideal depth information according to the current calibration parameter, the correct depth will not be estimated by querying the depth lookup table according to the depth information and the depth information stored in advance. As a result, the depth focus position may be different from the autofocus position obtained by the autofocus procedure. Accordingly, the deformation detection module 152 may determine whether the image deformation occurs on the reference image group according to the difference between the depth focus position and the autofocus position.

Referring back to FIG. 2, when the deformation detection module 152 detects that the image deformation occurs on the reference image group, in step S203, the parameter updating module 153 updates a current calibration parameter according to a plurality of feature point comparison values corresponding to the image groups, wherein the current calibration parameter is used for performing an image rectification on each of the first images and each of the corresponding second images. In other words, when the image capturing device 100 determines that the deformation or the offset occur on the first image sensor 110 and the second image sensor 120 to cause changes in parameter coordinate relationship between the first reference image and the second reference image, it indicates that the current calibration parameter can no longer perform an accurate image rectification on the images.

Therefore, in an embodiment, the parameter updating module 153 starts to collect the feature point comparison values of the image groups captured after capturing the reference image group, so that an ideal current calibration parameter may be generated according to the images captured by the first image sensor 110 and the second image sensor 120 after the deformation or the offset occurred. It should be noted that, the parameter updating module 153 may compare coordinate positions of the first feature points with coordinate positions of second feature points respectively corresponding to the first feature points to obtain the feature point comparison values. Furthermore, the parameter updating module 153 may also generate a new current calibration parameter according to the depth formation and the coordinate positions of the pixel points. Another embodiment is provided for detailed illustration below.

Figure 4:
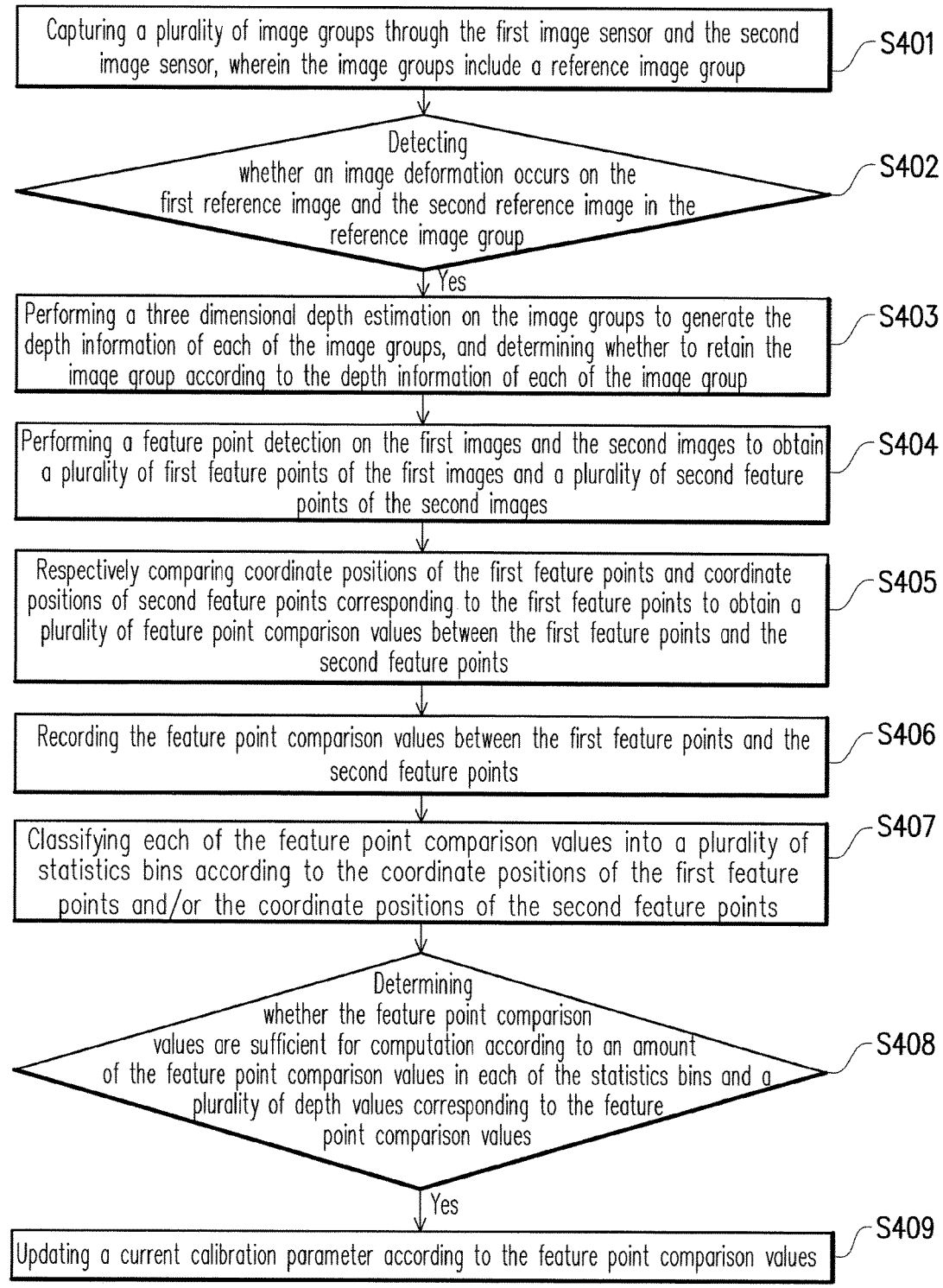
FIG. 4 is a flowchart illustrating a method for calibrating image deformation according to an embodiment of the invention.

FIG. 4 is a flowchart illustrating a method for calibrating image deformation according to an embodiment of the invention. Referring to FIG. 4, a method of the present embodiment is adapted to the image capturing device 100 of FIG. 1. The following detailed steps are elaborated to describe the method for calibrating image deformation of the present embodiment with the reference to each element of the image capturing device 100.

First, in step S401, the capturing module 151 captures a plurality of image groups through the first image sensor 110 and the second image sensor 120. Each of the image groups includes a first image and a second image, and the image groups include a reference image group. In step S402, the deformation detection module 152 detects whether an image deformation occurs on the first reference image and the second reference image in the reference image group. Step S401 and step S402 are similar or identical to step S201 and step S202 of the foregoing embodiment, thus descriptions thereof are not repeated hereinafter.

If the deformation detection module determines that the image deformation occurs on the reference image group, in step S403, the depth selection module 154 performs a three dimensional depth estimation on the image groups to generate the depth information of each of the image groups, and determines whether to keep the image group according to the depth information of each of the image group. More specifically, the depth selection module 154 may generate a three dimensional depth map associated with the first reference image and the second reference image by the image processing technology for stereo vision. Based on the depth information in the three dimensional depth map, the depth selection module 154 may obtain a depth of field range corresponding to the three dimensional depth map, and determine whether to keep or discard the image group according to the depth of field range.

Specifically, it is assumed that a depth value has a minimum value set to 0 and a maximum value set to 128, namely, the depth value of the image group falls within a value range of 0 to 128. In case the image group that falls within the depth of field range of the depth value 100 to the depth value 128 has been collected by the depth selection module 154, the depth selection module 154 will not keep the other image groups that fall within the depth of field range the depth value 100 to the depth value 128 thereafter. Otherwise, if the depth selection module 154 determines that the depth range of the image group captured currently falls outside the range of the depth value 100 to the depth value 128 (e.g., the depth range of the image group that falls with the depth value 0 to depth value 80), the depth selection module 154 will keep this image group to further utilize the feature point information of this image group.

In other words, the depth selection module 154 determines whether each of the image group is a valid image group according to depth of field information of each of the image groups. If most of the depth of field range of the newly captured image group overlaps with the depth of field range of the previous image group, the depth selection module 154 may filter the depth of field range of the newly captured image group accordingly. Based on above, in an embodiment, in addition to keep or filter the image group by determining whether the depth of field ranges are overlapped, the depth selection module 154 may also determine whether to keep the image group according to an overlap rate of the depth of field range. Accordingly, it can be ensured that the depth selection module 154 is capable of collecting information corresponding to all or most of the depth of field range while filtering redundant information according to the depth of field range corresponding to each of the image groups, so as to reduce a data processing amount and improve a data processing speed.

Thereafter, in step S404, the parameter updating module 153 performs a feature point detection on the first images and the second images to obtain a plurality of first feature points of the first images and a plurality of second feature points of the second images. In step S405, the parameter updating module 153 compares coordinate positions of the first feature points with coordinate positions of second feature points respectively corresponding to the first feature points to obtain the feature point comparison values of the first feature points and the second feature points. In step S406, the parameter updating module 153 records the feature point comparison values of the first feature points and the second feature points.

More specifically, the parameter updating module 153 may also detect the feature points of the first image and the second image in each of the image groups according to the algorithms for detecting the feature point in conventional art, so as to obtain the first feature points of the first images and the second feature points of the second images. Subsequently, the parameter updating module 153 determines the offset between the first feature point and the second feature point matching each other under the same coordinates system, and use the offset as the feature point comparison value. Therein, the first feature points and the second feature points matching each other are projected to the same positions of the captured scene. Namely, the feature point comparison value may be considered as the aberration between the first feature point and the second feature point. Thereafter, the parameter updating module 153 records the feature point comparison values of the first feature points and the second feature points, so as to establish a calibration database for updating the current calibration parameter. It is worth mentioning that, when it is determined that the image deformation occurs on the reference image group, the capturing module 151 continuously captures the images to obtain the image groups, and the parameter updating module 153 also continuously records the feature point comparison values of each of the image groups generated through calculation to the calibration database.

In step S407, the parameter updating module 153 classifies each of the feature point comparison values into a plurality of statistics bins according to the coordinate positions of the first feature points and/or the coordinate positions of the second feature points. In other words, in addition to record the feature point comparison values to the calibration database, the parameter updating module 153 also classifies the feature point comparison values into different statistics bins according to the coordinate positions corresponding to the feature point comparison values under the same coordinates system. Specifically, in an embodiment, the parameter updating module 153 may divide a first image region captured by the first image sensor 110 into a plurality of image blocks, and each of the image blocks is corresponding to one of the statistics bins. Therefore, according to the coordinate position of the first feature point, the parameter updating module 153 may have the feature point comparison values sequentially corresponding to one of the image blocks, so as to classify the feature point comparison values into the corresponding statistics bins.

Figure 5A:
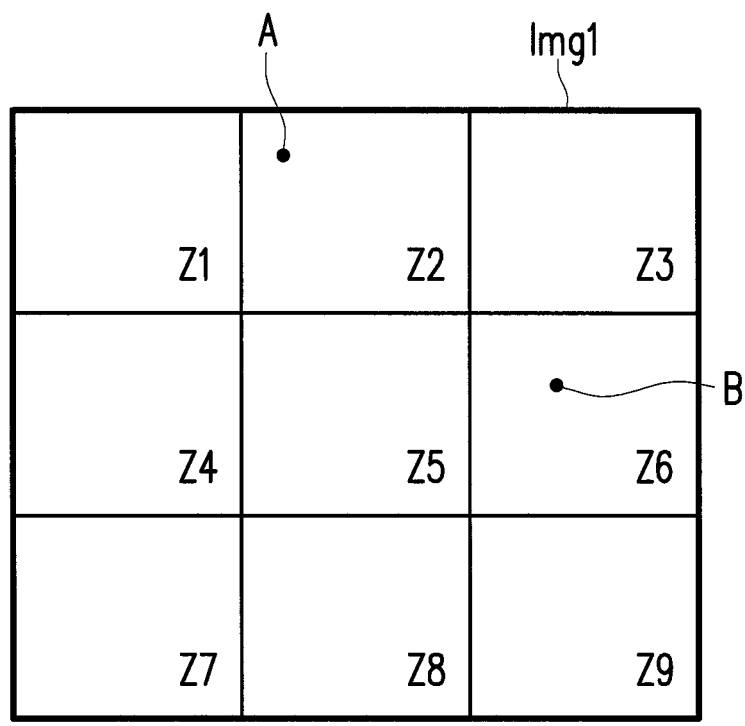
FIG. 5A and FIG. 5B are schematic diagrams illustrating an example of classifying the feature points into the statistics bins according to an embodiment of the invention.
Figure 5B:
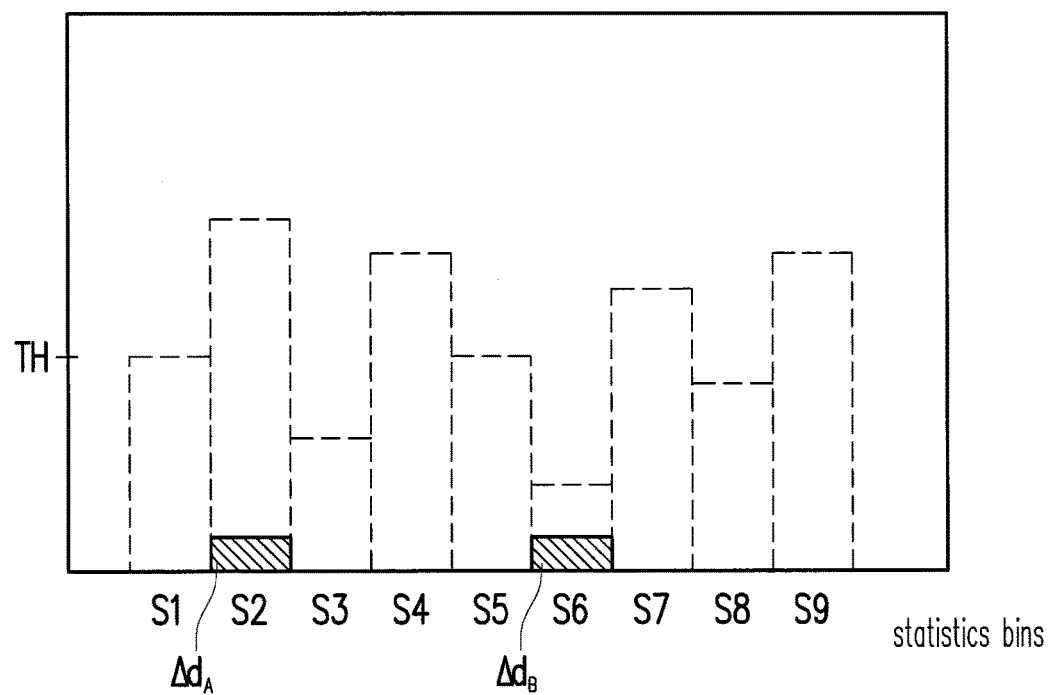

For instance, FIG. 5A and FIG. 5B are schematic diagrams illustrating an example of classifying the feature points into the statistics bins according to an embodiment of the invention. In the present example, referring to FIG. 5A first, the parameter module 153 divides a first image Img1 into nine (3×3) image blocks Z1 to Z9. The parameter updating module 153 further determines the image block to which first feature falls within according to the coordinate position of the first feature point. As shown in FIG. 5A, the parameter updating module 153 may be informed that a first feature point A is located within the image block Z2 according to the coordinate position of the first feature point A. Similarly, the parameter updating module 153 may be informed that a first feature point B is located within the image block Z6 according to the coordinate position of the first feature point B.

Referring to FIG. 5B, in the present example, the first image Img1 is divided into nine image blocks Z1 to Z9, and the image blocks Z1 to Z9 are corresponding to statistics bins S1 to S9 respectively. Therein, the image block Z1 is corresponding to the statistics bin S1; the image block Z2 is corresponding to the statistics bin S2; and the rest may be deduced by analogy. Based on above, since the first feature point A is located within the image block Z2, a feature point comparison value $\Delta d_A$ corresponding to the first feature point A is classified into the statistics bin S2. Since the first feature point B is located within the image block Z6, a feature point comparison value $\Delta d_B$ corresponding to the first feature point B is classified into the statistics bin S6. It should be noted that, FIG. 5A and FIG. 5B are only an exemplary embodiment instead of limiting the invention.

Moreover, in an embodiment, because the first feature points and the corresponding second feature points are on the same positions in the captured scene, the corresponding feature points on the first images and the second images are projected to the same coordinates under the three dimensional coordinate system after being calculated by a coordinate conversion. Accordingly, the parameter updating module 153 may classify the feature point comparison values into the corresponding statistics bins according to the coordinate positions of the first feature points and the second feature points projected under the three dimensional coordinate system. More specifically, based on the image processing technology for stereo vision, the parameter updating module 153 may obtain the depth information and the corresponding three dimensional position of each point in the image. The parameter updating module 153 may determine the corresponding statistics bins for the feature point comparison values according to a horizontal component and a vertical component of the three dimensional projected point corresponding the first feature point and the second feature point.

Accordingly, in step S408, the parameter updating module 153 determines whether the feature point comparison values are sufficient for computation according to an amount of the feature point comparison values in each of the statistics bins and a plurality of depth values corresponding to the feature point comparison values. Therein, the depth values are obtained by performing the three dimensional depth estimation on the first feature points and the corresponding second feature points. It can be known that, as an amount of the image groups increases, an amount of the information recorded in the calibration database also increases. Herein, the parameter updating module 153 may determine whether the information recorded in the calibration database are sufficient according to the amount of the feature point comparison values in each of the statistics bins and the depth values of the feature point comparison values.

In view of above, it can be known that the feature point comparison values have been classified into the corresponding statistics bins by the parameter updating module 153 according to the feature point information. Accordingly, the parameter updating module 153 may determine whether the calibration database includes sufficient amount of data according to the total amount of the feature point comparison values in each of the statistics bin. More specifically, in order to generate the current calibration parameter capable of correcting the left and right images to the ideal status under the current lenses disposition, it is most preferable that the feature points providing the feature point information are evenly distributed on the image. By using the feature point information provided by the feature points evenly distributed on each region on the image, an amount of rotation and a tilted condition of the entire image may be calculated accurately.

In the present embodiment, the feature point comparison values are classified into the corresponding statistics bins by the parameter updating module 153 according to the coordinate positions of the feature points, thus the amount of the feature point comparison values corresponding to each of the statistics bins is capable of representing a space distribution status for the feature points. Accordingly, the parameter updating module 153 determines whether the amount of the feature point comparison values in each of the statistics bins is sufficient as a mechanism for determining whether the amount of data is sufficient for calculating the accurate current calibration parameter.

Take FIG. 5B as an example for description, the parameter updating module 153 classifies the feature point comparison values into the nine statistics bins S1 to S9, wherein the statistics bin S1 at least includes the feature point comparison value $\Delta d_A$ and the statistics bin S6 at least includes the feature point comparison value $\Delta d_B$. As the parameter updating module 153 continuously records each of the feature point comparison values from the different image groups into each of the statistics bins, the amount of feature point comparison values in each of the statistics bins is also continuously accumulated (as shown by dot-lines in FIG. 5B). Once the amount of the feature point comparison values in each of the statistics bins S1 to S9 is sufficient, the parameter updating module 153 may then start to update the current calibration parameter. For instance, the parameter updating module 153 may determine whether the amount of data in the calibration database is sufficient by determining whether the corresponding amount in each of the statistics bins S1 to S9 exceeds a preset threshold TH. However, above-said example is only an exemplary embodiment instead of limiting the invention. Persons with ordinary knowledge in the art should be able to choose a classifying method for the feature point comparison values and a determination condition for determining whether the amount of data is sufficient based on practical demands, thus related description is omitted hereinafter.

In addition, the parameter updating module 153 may also determine whether the amount of data in the current calibration database is sufficient according to the depth information. More specifically, the depth value corresponding to each of the feature point comparison values may be obtained by performing the three dimensional depth estimation on the first feature points and the corresponding second feature points. In view of above, it can be known that the image groups having the overlapping depth of field range being overly great are already filtered by the depth selection module 154, so that the parameter updating module 153 may determine whether the feature point comparison values for most of the depth values are collected. In other words, in an embodiment, the parameter updating module 153 may also classify the feature point comparison values according to the depth value corresponding to each of the feature point comparison values, and determine whether the amount of the feature point comparison values corresponding to each of the depth values is sufficient, so as to determine whether the amount of data in the calibration database is sufficient.

It is worth mentioning that, during the process of establishing the calibration database, if the spatial deposition between the first image sensor 110 and the second image sensor 120 changes once again, it indicates that the data recorded in the calibration database has become useless. In an embodiment, before recording the feature point comparison values to the calibration database, the parameter updating module 153 may also determine whether the feature point comparison values are very different from the data in the calibration database. If yes, the parameter updating module 153 may discard the previously recorded data, and start to establish another calibration database to obtain the most ideal current calibration parameter.

In other words, once the parameter updating module 153 determines that the amount of data in the calibration database is sufficient, the parameter updating module 153 may then stop recording, and start calculating the new current calibration parameter. Otherwise, the parameter updating module 153 continuously records the new feature point comparison value to the calibration database. Therefore, if the determination of step S408 is yes, the parameter updating module 153 updates the current calibration parameter according to the feature point comparison values in step S409. The parameter updating module 153 finds an optimal current calibration parameter by performing, for example, an optimal algorithm by utilizing the feature point comparison values in the calibration database, so that the two images may correspond to an ideal coordinate parameter relation after being calibrated by the current calibration parameter. The optimal algorithm includes, for example, gradient decent method, Levenberg-Marquardt method (LM method) or a Gauss-Newton method, which is not particularly limited in the invention.

In summary, in an embodiment of the invention, when it is detected the image deformation occurs in real time, the image capturing device is capable of establishing the calibration database to adaptively calibrate the current calibration parameter pre-stored in the image capturing device, so as to calibrate the left and right images to include the ideal parameter coordinate relation. As a result, the current calibration parameter may be adjusted without being noticed by the user to ensure a capturing quality of the image capturing device. Furthermore, the embodiment of the invention is capable of further determining whether the feature point information in the database is completely collected according to the depth information and the positions of the feature points. Accordingly, once the sufficient amount of data is collected, the new current calibration parameter may be generated in real time by the feature point comparison values recorded in the calibration database, so as to substantially reduce the time required for collecting data and performing calibration.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for calibrating image deformation, for an image capturing device having a first image sensor and a second image sensor, wherein the image capturing device has a current calibration parameter associated with the first image sensor and the second image sensor, and the method for calibrating image deformation comprises:

capturing a plurality of image groups through the first image sensor and the second image sensor, wherein each of the image groups includes a first image and a second image, and the image groups include a reference image group;

detecting whether an image deformation occurs on a first reference image captured by the first image sensor and a second reference image captured by the second image sensor in the reference image group, wherein the current calibration parameter is related to a spatial deposition between the first image sensor and the second image sensor, and the image deformation occurs in response to variation of the spatial deposition between the first image sensor and the second image sensor; and updating the current calibration parameter according to a plurality of feature point comparison values corresponding to the image groups if it is detected that the image deformation occurs on the reference image group, wherein the current calibration parameter is used for performing an image rectification on each of the first images and each of the corresponding second images, wherein a step of updating the current calibration parameter according to the feature point comparison values corresponding to the image group further comprises:

classifying each of the feature point comparison values into a plurality of statistics bins according to coordinate positions of a plurality of first feature points of the first images and coordinate positions of a plurality of second feature points of the second images; and determining whether the feature point comparison values are sufficient for computation according to an amount of the feature point comparison values in each of the statistics bins and a plurality of depth values corresponding to the feature point comparison values, and if yes, updating the current calibration parameter according to the feature point comparison values, wherein the depth values are obtained by performing a three dimensional depth estimation on the first feature points and the corresponding second feature points.

2. The method for calibrating image deformation of claim 1, wherein the step of detecting whether the image deformation occurs on the reference image group comprises:

detecting a first feature point of the first reference image and a second feature point of the second reference image; and determining whether an offset between image coordinates of the first feature point of the first reference image and the second feature point of the second reference image exceeds a threshold, and if yes, determining that the image deformation occurs on the reference image group.

3. The method for calibrating image deformation of claim 1, wherein the step of detecting whether the image deformation occurs on the reference image group comprises:

performing a three dimensional depth estimation according to the first reference image and the second reference image to generate reference depth information of a reference focus target in the reference image group, and obtaining a depth focus position related to the reference focus target according to the reference depth information;

obtaining an autofocus position related to the reference focus target by an autofocus procedure; and determining whether the depth focus position corresponding to the reference focus target matches the autofocus position, and if no, determining that the image deformation occurs on the reference image group.

4. The method for calibrating image deformation of claim 1, wherein before the step of updating the current calibration parameter according to the feature point comparison values corresponding to the image groups, the method for calibrating image deformation further comprises:

performing a three dimensional depth estimation on the image groups to generate depth information of each of the image groups; and determining whether to keep the image group according to the depth information of each of the image groups.

5. The method for calibrating image deformation of claim 1, wherein the step of updating the current calibration parameter according to the feature point comparison values corresponding to the image group further comprises:

performing a feature point detection on the first images and the second images to obtain the first feature points of the first images and the second feature points of the second images;

comparing the coordinate positions of the first feature points with the coordinate positions of second feature points respectively corresponding to the first feature points to obtain the feature point comparison values of the first feature points and the second feature points; and recording the feature point comparison values of the first feature points and the second feature points.

6. An image capturing device having a first image sensor and a second image sensor, and the image capturing device comprising:

a storage unit, recording a plurality of modules, and storing a current calibration parameter associated with the first image sensor and the second image sensor; and a processing unit, coupled to the first image sensor, the second image sensor and the storage unit to access and execute the modules recorded in the storage unit, and the modules comprising:

a capturing module, capturing a plurality of image groups through the first image sensor and the second image sensor, each of the image groups including a first image of the first image sensor and a second image of the second image sensor, and the image groups including a reference image group;

a deformation detection module, detecting whether an image deformation occurs on a first reference image captured by the first image sensor and a second reference image captured by the second image sensor in the reference image group, wherein the current calibration parameter is related to a spatial deposition between the first image sensor and the second image sensor, and the image deformation occurs in response to variation of the spatial deposition between the first image sensor and the second image sensor; and a parameter updating module, wherein the parameter updating module updates the current calibration parameter according to a plurality of feature point comparison values respectively corresponding to the image groups if it is detected that the image deformation occurs on the reference image group, wherein the current calibration parameter is used for performing an image rectification on each of the first images and each of the corresponding second images, wherein the parameter updating module classifies each of the feature point comparison values into a plurality of statistics bins according to coordinate positions of a plurality of first feature points of the first images and coordinate positions of a plurality of second feature points of the second images, wherein the parameter updating module determines whether the feature point comparison values are sufficient for computation according to an amount of the feature point comparison values in each of the statistics bins and a plurality of depth values corresponding to the feature point comparison values, and if yes, the parameter updating module updates the current calibration parameter according to the feature point comparison values, wherein the depth values are obtained by performing a three dimensional depth estimation on the first feature points and the corresponding second feature points.

7. The image capturing device of claim 6, wherein the deformation detection module detects a first feature point of the first reference image and a second feature point of the second reference image, the deformation detection module determines whether an offset between image coordinates of the first feature point of the first reference image and the second feature point of the second reference image exceeds a threshold, and if yes, the deformation detection module determines that the image deformation occurs on the reference image group.

8. The image capturing device of claim 6, wherein the deformation detection module performs a three dimensional depth estimation according to the first reference image and the second reference image to generate reference depth information of a reference focus target in the reference image group, and obtains a depth focus position related to the reference focus target according to the reference depth information, the deformation detection module obtains an autofocus position related to the reference focus target by an autofocus procedure, and the deformation detection module determines whether the depth focus position corresponding to the reference focus target matches the autofocus position, and if no, the deformation detection module determines that the image deformation occurs on the reference image group.

9. The image capturing device of claim 6, wherein the modules further comprise:

a depth selection module, wherein the depth selection module performs a three dimensional depth estimation on the image groups to generate depth information of each of the image groups, and the depth selection module determines whether to keep the image group according to the depth information of each of the image groups.

10. The image capturing device of claim 6, wherein the parameter updating module performs a feature point detection on the first images and the second images to obtain the first feature points of the first images and the second feature points of the second images, the parameter updating module compares the coordinate positions of the first feature points with the coordinate positions of second feature points respectively corresponding to the first feature points to obtain the feature point comparison values of the first feature points and the second feature points, and the parameter updating module records the feature point comparison values of the first feature points and the second feature points.

* * * * *